Feb. 21, 1961          H. H. MARTIN          2,972,208
FROST PREVENTER
Filed Dec. 8, 1958                                  2 Sheets-Sheet 1
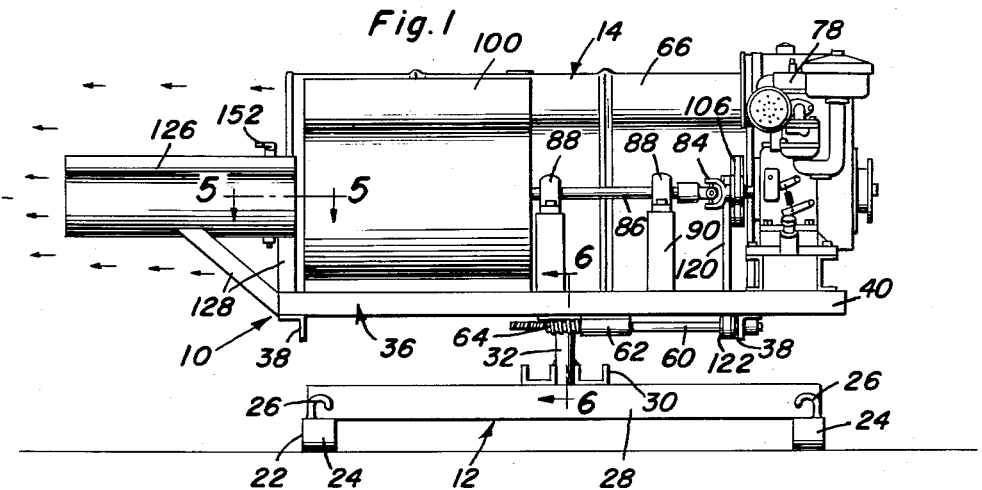
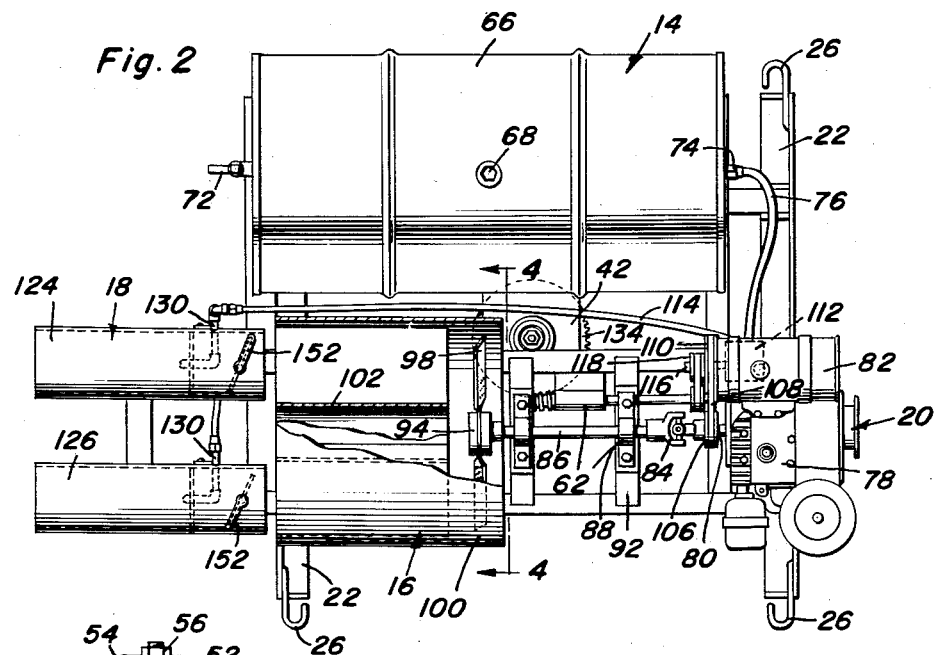
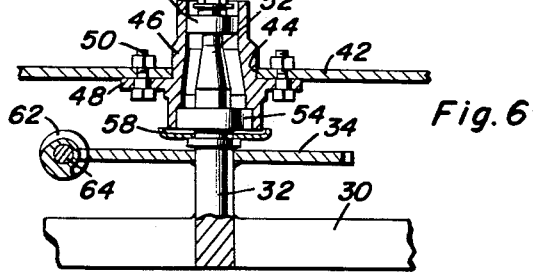
Howard H. Martin
INVENTOR.

Feb. 21, 1961     H. H. MARTIN     2,972,208
FROST PREVENTER
Filed Dec. 8, 1958     2 Sheets-Sheet 2
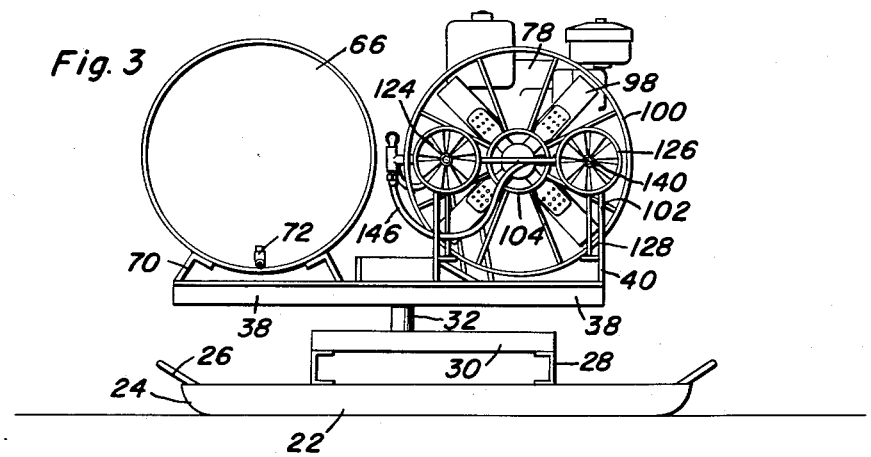
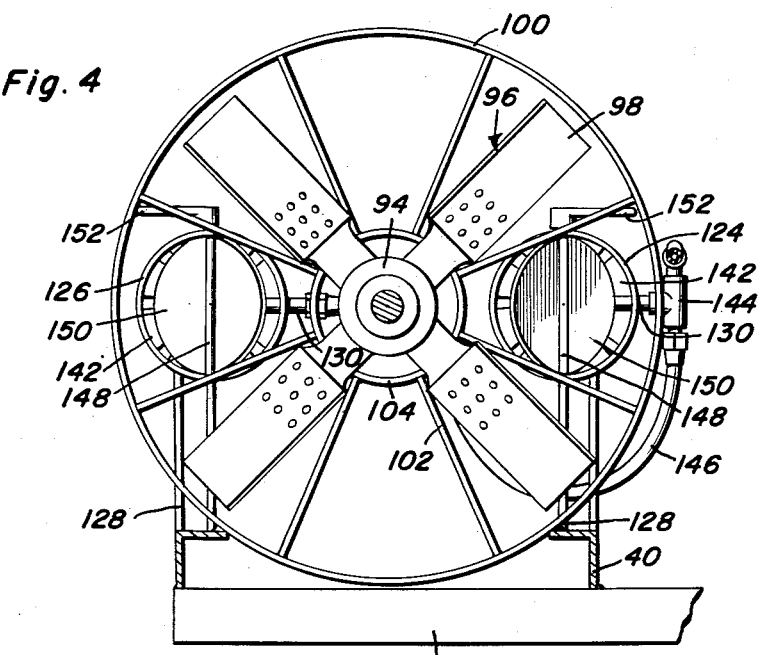
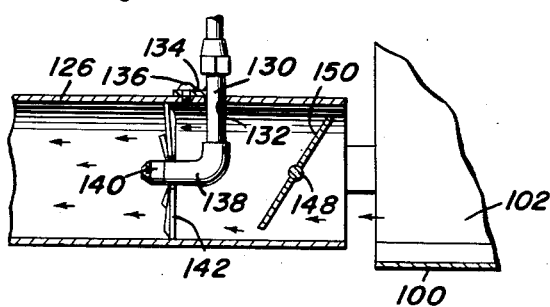
Howard H. Martin
INVENTOR.

United States Patent Office 2,972,208
Patented Feb. 21, 1961

2,972,208
FROST PREVENTER
Howard H. Martin, Rte. 1, Box 251, Waterford, Calif.
Filed Dec. 8, 1958, Ser. No. 778,714
10 Claims. (Cl. 47—2)

The present invention generally relates to a heating device and more particularly to a device for reducing frost and which is adapted to maintain field temperatures above critical low temperatures damaging to various crops in fruit orchards, truck gardens or the like.

It sometimes occurs that a killing frost or somewhat lighter frost causes damage to fruit trees, plants or the like and also will damage the blossoms or produce all of which are detrimental to the production of fruit, vegetables or the like. In order to reduce this damage or to eliminate it, there have been various apparatus provided for raising the temperature of the air in an orchard or field and also cause movement of the air. Such devices include smudge pots and similar devices which require the use of a great number of the same and also leave deposits of smoke, soot and the like on the produce which may lower the quality thereof. Therefore, it is the primary object of the present invention to provide a heating device which includes a novel burner assembly along with a fan assembly for efficiently producing a large volume of heated air with the fuel being consumed efficiently with the entire assembly being mounted upon a portable balanced self-standing base so that the overall device may be readily transported to the desired area to be heated.

A further object of the present invention is to provide a frost preventer in the form of a heating device which is simple in construction, efficient in use, economical to operate, dependable and relatively inexpensive to manufacture and maintain.

Another feature of the present invention is to provide a frost preventer which is readily portable so that it may be moved to the desired location with the loss of little time and including a self-contained assembly which does not require the application of external driving force from a power take-off such as on a tractor or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of the frost preventer of the present invention;

Figure 2 is a plan view of the construction shown on Figure 1 with a portion of the device broken away for illustrating the structure thereof;

Figure 3 is an end elevation of the construction of Figure 1 illustrating the relationship of the component parts of the frost preventer;

Figure 4 is a transverse, sectional view, taken substantially upon a plane passing along reference line 4—4 of Figure 2 illustrating the relationship of the fan and burner units;

Figure 5 is a detail sectional view taken substantially upon a plane passing along section line 5—5 of Figure 1 illustrating the construction of the burner unit; and Figure 6 is a detailed sectional view taken substantially upon a plane passing along section line 6—6 of Figure 1 illustrating the mounting construction for the frost preventer whereby the same rotates about a vertical axis.

Referring now particularly to the drawings, the numeral 10 generally designates the frost preventer of the present invention which includes a movable supporting base generally designated by the numeral 12, a fuel supply tank generally designated by the numeral 14, a fan assembly generally designated by the numeral 16, a burner assembly generally designated by the numeral 18, and a power assembly generally designated by the numeral 20 all of which are grouped together and mounted on the supporting base 12.

The supporting base 12 includes a pair of transverse skid members 22 which may be of angle iron construction and which have upwardly curved outer ends 24 with each end having an inwardly facing hook shaped member 26 connected thereto and extending upwardly and outwardly therefrom for engagement with a suitable towing vehicle whereby the rounded ends 24 will permit the frost preventer 10 to be pulled over the ground surface for expeditiously moving the frost preventer to a desired location with the hook on each end of the transverse skids 22 providing for movement of the device in either direction. Rigidly interconnecting the transverse skids 22 is a pair of parallel longitudinal rail members 28 which may be secured to the upper surface of the transverse skids 22 in a rigid manner as by welding and the longitudinal rail members 28 may be conveniently inwardly facing channel shaped members. Extending parallel to the transverse skid members 22 and disposed centrally of the longitudinal rail member 28 is a pair of transversely extending and upwardly facing channel shaped members 30 which may be secured to the longitudinal rail members 28 rigidly such as by welding. Supported between the transverse members 30 and rigidly attached thereto as by welding is a vertically disposed shaft 32 that is provided with a worm pinion 34 secured rigidly thereto and disposed in a horizontal relation.

The fuel tank 14, fan assembly 16, burner assembly 18 and power assembly 20 are supported on an openwork frame structure generally designated by the numeral 36 which includes a pair of transverse rails 38 rigidly interconnected by a plurality of longitudinally extending rails 40. Mounted rigidly to the longitudinal rails 36 is a plate 42 having a central opening 44 which receives a generally cylindrical hub 46 having a projecting flange 48 secured to the plate 42 by bolts 50. The shaft 32 is provided with an upper tapered spindle portion 52 receiving a pair of spaced bearing assemblies 54 which are interposed between the hub 46 and the tapered portion 52. A retaining nut 56 is provided and a protector or backing plate 58 forms a closure for the bottom end of the hub 46. The tapered portion or spindle 52 along with the hub 46 and the bearing assemblies 54 may be of the type known and generally employed in automobile construction for mounting the wheel rotatably on a spindle such as on the front of an automobile. Thus, the bolts 50 permit the plate 42 to be removed and this construction provides the utility of employing readily available component parts for constructing the device.

Underlying the frame 36 is a drive shaft 60 journalled in bearings 62 and provided with a worm wheel or drive gear 64 in meshing engagement with the worm pinion 34 whereby rotation of the shaft 60 will cause the plate 42 and, of course, the frame 36 to rotate about the vertical axis of the shaft 32. The shaft 32 and worm pinion 34 are stationary thus causing the worm drive gear 64 to propel the frame 36 about a vertical axis.

The fuel tank 14 includes an enlarged and horizontally disposed receptacle 66 in the form of a conventional drum of metallic construction having the usual filling opening and closure therefor designated by the numeral 68 for replenishing the supply of fuel in the fuel tank. The receptacle 66 is supported by a pair of inwardly inclined longitudinal rail members 70 rigidly connecting the receptacle 66 to the transverse rail members 38. One end of the receptacle 66 is provided with a drain spout or faucet 72 and the other end thereof is provided with an adapted 74 connected to a fuel line 76 which is connected to the tank or receptacle 66 adjacent the bottom thereof.

The power unit 20 includes an internal combustion engine 78 having the usual power output shaft 80 which is horizontal and the internal combustion engine 78 is of conventional construction and is commercially available and generally includes a fuel tank 82 and the necessary controls for operating the engine at a constant rate of speed. The output shaft 80 is connected to a universal joint 84 which in turn is connected to a power shaft 86 journaled in bearings 88 supported on upstanding support blocks 90 carried by transverse support members 92.

The outer end of the drive shaft 86 is connected to the hub 94 of a fan generally designated by the numeral 96 and which includes a plurality of radially extending blades 92 each of which is inclined in relation to the plane of rotation whereby air will be moved axially of the fan 96. The fan 96 is disposed at one end of a cylindrical housing 100 which forms a tunnel for the passage of air and the housing 100 is provided with a plurality of radially extending plates or vanes 102 which have their outer ends rigidly connected to the housing 100 and which have their inner ends rigidly attached to a cylindrical hub-like open-ended sleeve 104 in concentric relation to the cylindrical housing 100. The vanes 102 and the cylindrical hub 104 extend from a point adjacent to the discharge side of the fan 96 to a point planar with the discharge end of the housing 100. The housing 100 is supported on the longitudinal support members 40 by any suitable means such as by welding or the like.

The power output shaft 80 also drives a pulley 106 which receives a V-belt 108 which also encircles a pulley 110 which drives a fuel pump 112 having the discharge line 76 from the receptacle 66 connected to the intake side thereof and flexible high pressure fuel line 114 connected to the discharge side thereof. The fuel pump 112 has the pulley 110 mounted on a shaft 116 that also is provided with a smaller pulley 118 receiving a V-belt 120 which encircles a pulley 122 on the drive shaft 60 thereby providing means for driving the shaft 60 and worm wheel 64 at a reduced rate of speed and also for causing slow rotation of the frame 36 and the various assemblies mounted thereon about the axis of the shaft 32 when the engine 78 is operating.

On the discharge end of the cylindrical housing 100, a pair of open-ended longitudinally extending cylindrical members or barrels 124 and 126 are arranged in side-by-side spaced parallel relation with the members 124 and 126 being longitudinally elongated and supported from the longitudinal rails 40 by support brackets 128 which extend vertically and which may be rigidly attached as by welding. Each of the cylindrical members or barrels 124 and 126 is provided with a fuel line 130 extending through an opening 132 and which is held in position by a lug 134 welded thereon and a screw threaded fastener 136 extending through the lug and into the cylindrical member. Figure 5 illustrates the details of this construction in which the fuel line 130 also includes an elbow 138 centrally disposed in the cylindrical member and including a fuel burning nozzle 140 which projects towards the discharge end of the cylindrical member, that is, the end remote from the housing 100. Mounted on the elbow 38 adjacent the burner nozzle 140 is a plurality of radially extending deflector vanes 142 which are inclined in relation to the transverse plane whereby air passing through the deflector vanes or deflector assembly will be caused to swirl generally about the longitudinal axis of the cylindrical member. The deflector vanes 142 may be considered to be a vane-type swirl plate since it causes the air to swirl for more effective mixing with the fuel. The fuel pipe 130 on the cylindrical member 124 is connected to a T-coupling 144 connected with the fuel line 114 with the other branch being connected to a fuel line 146 connected to the other fuel inlet pipe 130.

Each of the cylindrical members or barrels 126 is also provided with a vertically extending rotatable shaft 148 having a rigid circular plate 150 mounted thereon. The shaft 148 extends above the cylindrical member and is provided with a laterally extending handle 152 wherein the angular position of the circular plate 150 may be adjusted. The circular plate 150 effectively forms a damper for controlling the flow of air through the cylindrical members 124 and 126.

The present device is constructed to burn Diesel fuel and the fuel oil is delivered to the nozzles at approximately 100 pounds per square inch. While the dimensions of the device may vary, a practical device has been constructed with the cylindrical members or barrels 124 and 126 being 16 inches in length and 6 inches in diameter with the fan 98 being 21 inches in diameter. The supply receptacle is a conventional 50 gallon oil drum lying on its side and the swirl plate has eight sections and is formed by making several evenly spaced cuts from the perimeter to within one half inch of the center hole and bending each segment slightly to obtain an appearance of a propeller and the swirl plate is then welded solid to the cylindrical members. The high pressure nozzle atomizes the oil and discharges the same into the turbulent air thereby rendering it readily combustible. This combustible mixture may be ignited by any suitable ignition device (not shown) which may be conveniently a torch and the fuel plumbing may be provided with control valves as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable heated air frost preventer for use in orchards or the like comprising, in combination, a supporting frame, a fan rotatably mounted on said frame for rotation about a horizontal axis, a housing in which said fan is confined for impelling the axial air flow induced by the fan, power means on said frame for driving said fan, a burner assembly mounted on said frame in alignment with but spaced forwardly of the discharge end of the housing, fuel supply means for said burner assembly also mounted on said frame, and means driven by said power means for supplying fuel under pressure to said burner assembly, said burner assembly including at least one open-ended barrel in alignment with said fan housing, a burner nozzle supported in said barrel and directed toward the discharge end thereof, a deflector swirl plate for said burner nozzle for creating a turbulence in the air passing from the housing into the barrel, said swirl plate being fixed in said barrel rearwardly of the tip of said nozzle and a manually adjustable damper for controlling the flow of air, said damper being mounted in the barrel between the swirl plate and the intake end of the barrel, said housing being of a cross-section appreciably greater than the cross-section of said barrel.

2. The structure as defined in claim 1, and in combination, a mobile base, an upstanding shaft rigid with said base, said frame being rotatably mounted on said shaft, and means driven from said power means for rotating the frame in relation to the base whereby the air warmed by the burner assembly may be discharged and circulated in a circular path while the frame and the parts thereon rotate.

3. A frost preventer comprising a supporting frame, a fan rotatably mounted on said frame for rotation about a horizontal axis, a housing for said fan for guiding the axial air flow produced by the fan, means on said frame for driving said fan, a burner assembly mounted on said frame in alignment with the air discharge end of the housing, fuel supply means for said burner assembly, said fuel supply means being mounted on said frame, means driven by said power means for supplying fuel under pressure to said burner assembly, said burner assembly including at least one cylindrical member in alignment with the housing for the fan, a burner nozzle located in said cylindrical member and facing the discharge end thereof, a deflector swirl plate for said burner nozzle for creating a turbulence in the air passing from the housing into the cylindrical member, and a damper for controlling the flow of air, said damper being located between the swirl plate and the intake end of the cylindrical member, said fan housing including a plurality of radially extending guide vanes disposed in a longitudinal plane with the inner ends of the vanes interconnected by a cylindrical hub-like inner member concentric with the housing, thereby straightening the flow of air impelled by the fan.

4. A frost preventer comprising a supporting frame, a fan rotatably mounted on said frame for rotation about a horizontal axis, a cylindrical housing for said fan for guiding the axial air flow produced thereby, power means on said frame for driving said fan, a burner assembly mounted on said frame in alignment with the discharge end of the housing, fuel supply means for said burner assembly, said fuel supply means being mounted on said frame, means driven by said power means for supplying fuel under pressure to said burner assembly, said burner assembly including at least one cylindrical member in alignment with the housing for the fan, a burner nozzle located in said cylindrical member and facing the discharge end thereof, a deflector swirl plate for said burner nozzle for creating a turbulence in the air passing from the housing into the cylindrical member, and a damper for controlling the flow of air, said damper being located between the swirl plate and the intake end of the cylindrical member, said fuel supply means including a drum mounted on said frame, said means for supplying fuel under pressure including a fuel pump driven from the power means and communicated with the burner nozzle for discharging atomized fuel into the air after it passes through the swirl plate for providing an atomized combustible mixture.

5. For use in reducing frost damage in an orchard or the like; a mobile heat generating and heated air circulating machine comprising a balanced self-standing base embodying means whereby said base may be bodily shifted from place to place in the area which requires distributed heated air, a horizontal frame structure mounted for rotation on and above said base and adapted to rotate in a horizontal plane on a vertical axis through a full curcular path, a prime mover fixedly and operatively mounted atop said frame structure, an open ended fan housing fixed atop the frame structure and spaced forwardly of and disposed in alignment with said prime mover, a blower fan mounted for rotation in the rear intake end portion of said housing and having operating connection with said prime mover, at least one fuel burner embodying an open-ended barrel supported forwardly of the air-blasting discharge end of said housing, a burner nozzle supported in a median portion of the bore of the barrel, a vane-type swirl plate fixed in the median portion of the barrel and cooperable with the burner nozzle, the rear air intake end of said barrel being spaced from the discharge end of the housing, an adjustable damper mounted in the intake end portion of said barrel, means cooperable with the prime mover and burner nozzle for delivering fuel under pressure to the burner nozzle, fuel supply means also mounted on the frame structure, and an operating connection between the frame structure and prime mover for rotating said frame structure and all parts mounted thereon as a unit.

6. The structure defined in claim 5, and wherein said base embodies an openwork frame provided therebeneath with sled-like skids having means to facilitate connection thereto of a suitable towing vehicle, said frame structure being of open-work construction to expedite the movement and circulation of atmospheric as well as heated air.

7. The structure defined in claim 5, and wherein said base embodies an openwork frame provided therebeneath with sled-like skids having means to facilitate connection thereto of a suitable towing vehicle, said frame structure being of open-work construction to expedite the movement and circulation of atmospheric as well as heated air, said prime mover being postioned relatively close to the air intake end of the fan housing and the operating connection comprising a short shaft to take advantage of cooling the prime mover and taking the radiated heat into the fan housing yet not subjecting the fan to undue heating either from the prime mover or from the forwardly positioned burner and its heated and heat rapliating barrel.

8. For use in reducing frost damage in an orchard or the like; a mobile heat generating and heated air circulating machine comprising a balanced self-standing base embodying means whereby said base may be bodily shifted from place to place in the area which requires distributed heated air, a horizontal frame structure mounted for rotation on and above said base and adapted to rotate in a horizontal plane on a vertical axis through a full circular path, a prime mover fixedly and operatively mounted atop said frame structure, an open-ended fan housing fixed atop the frame structure and spaced forwardly of and disposed in alignment with said prime mover, a blower fan mounted for rotation in the rear intake end portion of said housing and having operating connection with said prime mover, a pair of spaced parallel coplanar duplicate fuel oil burner assemblies supported in front of and spaced from the discharge end of said fan housing, each assembly having an open-ended tubular barrel containing burner means and intake air regulating damper means, both barrels being supported within a circle less than the circumferential limits of the fan housing, said fan being of a cross-section approximately several times the cross-section of each barrel, whereby both barrels are effectually supplied with air from the fan housing, the excess supply of air being blasted over and all around the barrels to effectively utilize the heated air to best advantage.

9. A heated air circulating device comprising support means, a horizontally elongated tubular open-ended fan housing mounted on said support means, said housing being of an appreciable cross-section and providing an air tunnelling passage having air intake and discharge ends, air intercepting and distributing means mounted in said air-tunnelling passage, said intercepting means comprising a concentric open-ended hub-like sleeve surrounded by radial fins joined to said sleeve and to the interior of the housing and circumferentially spaced from each other, said intercepting means being flush with the forward discharge end of the housing and terminating at its rearward end forwardly of the intake end of the housing, a prime mover mounted on the support means in longitudinal alignment with the housing and having a relatively short drive shaft extending into a rear end portion of the housing and provided with a heavy duty blower-type fan, a pair of spaced parallel coplanar duplicate fuel oil burner assemblies supported in front of and spaced from the discharge end of said fan housing, each assembly having an open-ended tubular barrel containing burner means and intake air regulating damper means, both barrels being supported within a circle less than the circumferential limits of the fan housing, said fan being of a cross-section approximately several times the cross-section of each barrel, whereby both barrels are effectually supplied with air from the fan housing, the excess supply of air being blasted over and all around the barrels to effectively utilize the heated air to best advantage.

10. A heated air circulating device comprising support means, a horizontally elongated tubular open-ended fan housing mounted on said support means, said housing being of an appreciable cross-section and providing an air intake passage, the latter having air intake and discharge ends, an air intercepting and distributing means mounted in the air-tunnelling passage of said housing, said means comprising a concentric open-ended hub-like sleeve surrounded by radial fins joined to the sleeve and to the interior of the housing and circumferentially spaced from each other, said means being flush with the forward discharge end of the housing and terminating at its rearward end forwardly of the rear intake end of the housing, a prime mover mounted on the support means in longitudinal alignment with the housing and having a relatively short drive shaft extending into the rear end portion of the housing and provided with a heavy duty blower-type fan, and burner means fixed on the support means and embodying at least one elongated barrel of a cross-section appreciably less than the cross-section of said housing, said barrel being open at its ends, having its air intake end spaced from the discharge end of the housing and being situated and supported within the limits of a circle equal in circumference to the outside circumference of said housing and aligned with the housing, a swirl-type plate fixed in the median portion of the bore of said barrel, a burner mounted in said bore and cooperable with an axial opening provided therefor in said plate, and means at the intake end of the barrel regulating the amount of air capable of passing into the bore from said fan housing.

References Cited in the file of this patent

UNITED STATES PATENTS

| | | |
|---|---|---|
| 1,670,626 | Lalor | May 22, 1928 |
| 2,156,405 | Smoot | May 2, 1939 |
| 2,369,367 | Owen | Feb. 13, 1945 |
| 2,585,081 | Bernhard | Feb. 12, 1952 |
| 2,663,365 | De Lancey | Dec. 22, 1953 |
| 2,846,816 | Maloof | Aug. 12, 1958 |
| 2,897,885 | Sherman | Aug. 4, 1959 |